Nov. 23, 1954  E. A. NEUGASS  2,695,354
INSTRUMENT PANEL LIGHTING
Filed Dec. 16, 1950  3 Sheets-Sheet 1
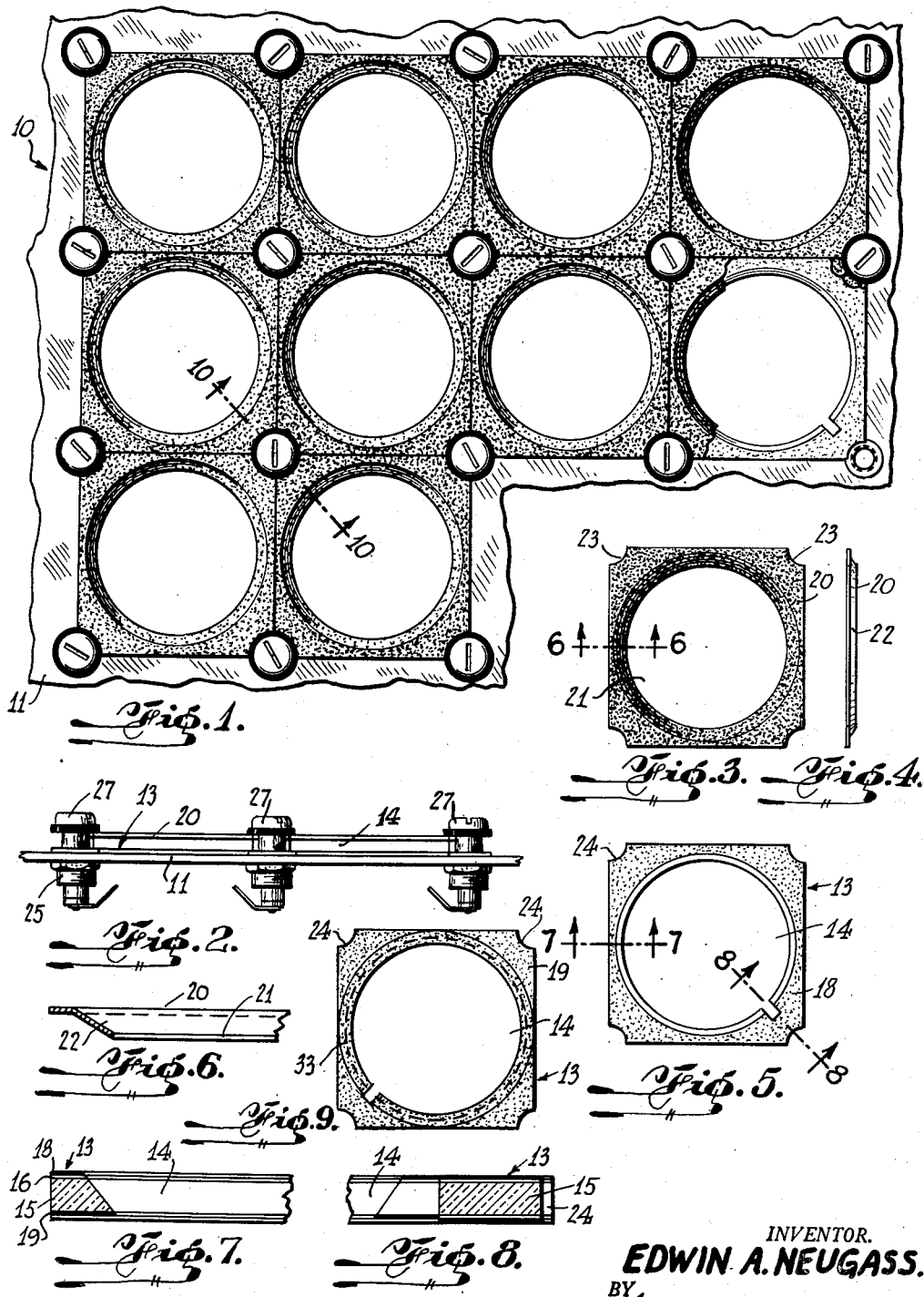
INVENTOR.
EDWIN A. NEUGASS.
BY
ATTORNEY.

Nov. 23, 1954   E. A. NEUGASS   2,695,354
INSTRUMENT PANEL LIGHTING
Filed Dec. 16, 1950   3 Sheets-Sheet 2

INVENTOR.
EDWIN A. NEUGASS.
BY
ATTORNEY.

Nov. 23, 1954  E. A. NEUGASS  2,695,354
INSTRUMENT PANEL LIGHTING
Filed Dec. 16, 1950  3 Sheets-Sheet 3

INVENTOR.
EDWIN A. NEUGASS.
BY
ATTORNEY.

United States Patent Office 2,695,354
Patented Nov. 23, 1954

2,695,354

INSTRUMENT PANEL LIGHTING

Edwin A. Neugass, White Plains, N. Y.

Application December 16, 1950, Serial No. 201,138

6 Claims. (Cl. 240—8.16)

The present invention relates to improvements in panels and particularly to panels for aircraft instruments.

An object of the present invention is to provide a panel for aircraft instruments formed to illuminate the latter in a glareless manner and arranged so that construction and maintenance of the panel as well as of the instruments is substantially simplified.

Another object is to provide a panel for aircraft instruments including an individual edge illuminated panel section for each of the instruments which is removable from the panel independent of any of the other sections of the latter.

Another object is to provide a panel for aircraft instruments including individual edge illuminated panel sections for illuminating the various instruments, wherein the lighting devices illuminating the sections at the latter's edges also maintain such sections in their operative positions on the panel.

Still another object resides in the provision of a panel for aircraft instruments of the character indicated which illuminates the supported instruments without reflecting light toward the viewer.

A further object is to provide an instrument illuminating panel section formed at least in part of a light transmitting core having an opening formed therein to expose the dial or face of an instrument supported therebehind, wherein at least the portion of the back surface of the core extending around the opening is painted black to absorb light and prevent reflection thereof towards the viewer.

A still further object is to provide a standardized instrument illuminating section for a panel so that panels may be conveniently assembled having instruments of varying number and location.

The above and various further and more specific objects, features and advantages will clearly appear from the following detailed description taken in connection with the accompanying drawings which form a part hereof and illustrate merely by way of example embodiments of the invention.

The invention consists in such novel features, arrangements and combinations of parts as may be shown and described in connection with the instrument panels herein disclosed by way of example only and constructed according to preferred embodiments of the invention.

In the drawings:

Fig. 1 is a front elevational view of a portion of a panel for aircraft instruments or the like constructed according to a preferred embodiment of the present invention;

Fig. 2 is a fragmentary bottom edge view of the panel of Fig. 1;

Fig. 3 is a front elevational view of a cover shield forming a part of the panel of Fig. 1;

Fig. 4 is a side elevational view of the cover shield of Fig. 3;

Fig. 5 is a front elevational view of an illuminating section forming a part of the panel of Fig. 1;

Fig. 6 is a fragmentary sectional view, on an enlarged scale, taken along the line 6—6 of Fig. 3;

Fig. 7 is a fragmentary sectional view, on an enlarged scale, taken along the line 7—7 of Fig. 5;

Fig. 8 is a fragmentary sectional view, on an enlarged scale, taken along the line 8—8 of Fig. 5;

Fig. 9 is a rear elevational view of the illuminating section of Fig. 5;

Figure 12:
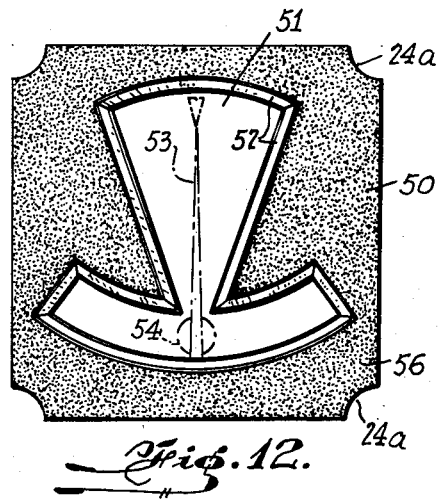
Figure 13:
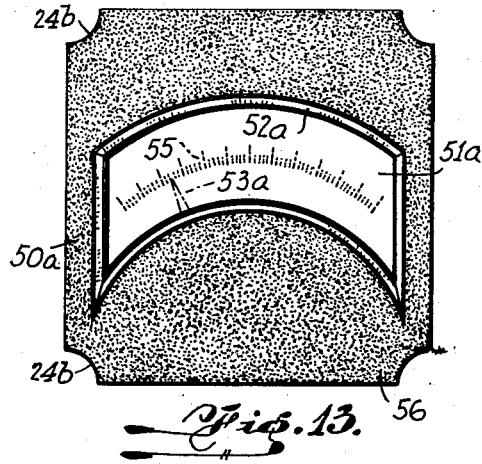
Figures 14, 15:
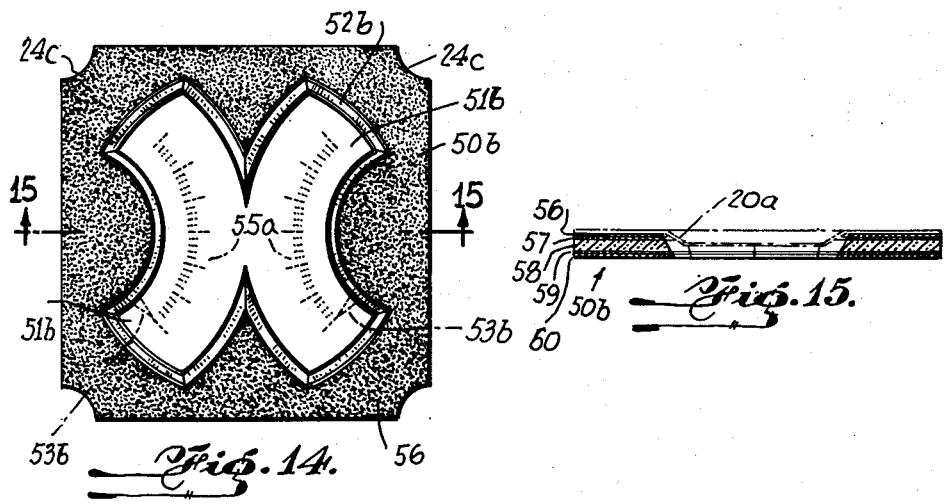

Figs. 12–14, inclusive, are front elevational views of other forms of the illuminating sections which may form a part of the panel of Fig. 1, and Fig. 15 is a sectional view taken on line 15—15 of Fig. 14 with the shield 20a added.

Referring to the drawings, wherein like reference numerals denote like parts in the several figures thereof, and in particular to Figs. 1 to 10, inclusive, a panel is there shown constructed according to an embodiment of the present invention. Such panel 10 includes a flat supporting plate 11, preferably formed of metal, which is provided with suitably located and dimensioned openings 12 (Fig. 10) to register with and expose the faces of the various aircraft instruments or the like (not shown) that may be mounted behind such supporting plate. It is to be understood that the supporting plate is shaped to fit into the available space in the cockpit or other control room of the aircraft for which it is intended, and that an opening 12 is provided for each of the instruments behind the supporting plate.

In order to provide for the illumination of the instruments without glare or reflectoin toward the viewer, an illuminating panel section 13 (Figs. 5, 7, 8 and 9) is associated with each of the instrument viewing openings 12 of the supporting plate. As seen in Figs. 5 and 9, each panel section 13 is preferably of substantially square plan form so that the several sections may be disposed in edge to edge relation on the front of the supporting plate 11, and is provided with a circular opening 14 registering with the related opening 12 and having its edge bevelled toward the front surface (Figs. 7 and 8) to permit viewing of the entire face of the instrument behind the opening 12 from a position displaced from the normal to the center of the instrument face. Each illuminating panel section includes a sheet or core 15 of clear, transparent, light-transmitting material, preferably plastic, such as, for example, one of the acrylic resins or materials, and their polymers and copolymers, methyl methacrylate being preferred, although other light transmitting material, such as, quartz may be employed. The entire front surface of the core 15 is coated with a layer 16 of light colored, preferably white, material to reflect all light rays attempting to escape at the front surface back into the core, and for this purpose the layer 16 is preferably formed of an opaque plastic material, such as, for example, a material of the class of vinyl resins. All of the rear surface of the core 15, with the exception of a circular band extending around the opening 14, is coated with a layer 17 of a light colored material similar to that used for the layer 16.

Opaque dark colored outer layers 18 and 19 are applied to the front surface, on top of the layer 16, and to the rear surface covering the layer 17 as well as the otherwise uncovered circular band surrounding the opening 14, respectively. The opaque outer layers 18 and 19 may be formed of coats of dull, opaque paint or lacquer, however, it is preferred to use opaque sheets of a dark colored vinyl resin for this purpose.

While the panel section 13 may be formed as above, it is also contemplated to use a laminated sheet of five layers, such as is set forth in my United States Letters Patent No. 2,595,973, issued May 6, 1952, as the starting material from which the sections are formed. In that case, the two rearmost layers of the lamination or sandwich will be removed in a circular area surrounding the opening formed in the section to expose the rear surface of the central light transmitting core, and such exposed surface coated with a dark colored, preferably black, light absorbing paint or lacquer, or any other suitably dark and opaque layer.

The bevelled edge of the section 13 defining the opening 14 is polished to permit light transmitted through the core 15 to be emitted from this polished edge for illuminating the face of an instrument disposed at such opening.

Figure 10:
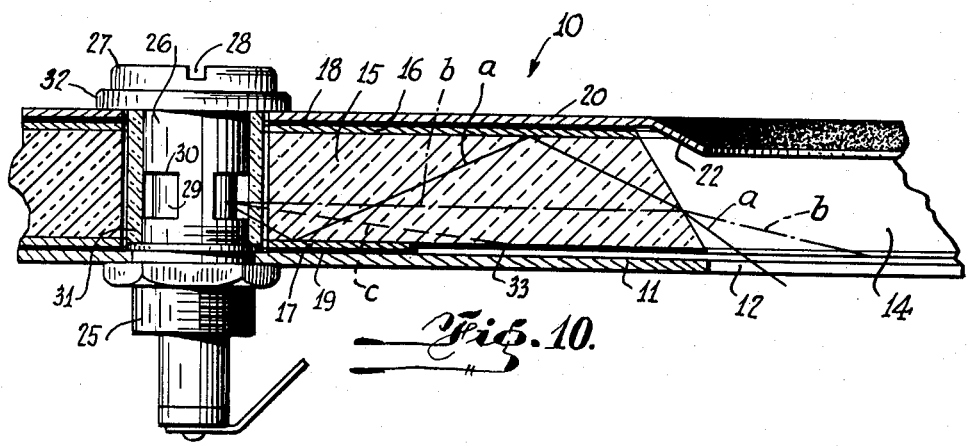
Fig. 10 is a fragmentary sectional view, on an enlarged scale, showing the assembled panel and indicating the paths of various illuminating light rays, and taken along the line 10—10 of Fig. 1.

In order to prevent the reflection of light toward the viewer, an opaque, preferably metal cover or shield 20 coextensive with the marginal edges of each panel section 13 is provided overlying the front surface of the latter. Each cover or shield 20 (Figs. 3, 4, 6 and 10) is formed with a central opening 21 at the center thereof, registering with the opening 14 of the related illuminating panel section, and having a rearwardly bent flange 22 along the edge thereof to overlie the beveled light emitting edge of the panel section at the opening of the latter (Fig. 10). Thus, the flange 22 of shield 20 decreases the angle at which the light emitting bevelled edge of the opening 14 is visible to the viewer.

As seen in Figs. 3 and 5, each of the shields 20 and illuminating panel sections 13 is formed with arcuate cut-outs 23 and 24, respectively, in the four corners thereof to receive the combined devices for illuminating the cores 15 of the sections 13 and for securing the shields 20 and sections 13 to the supporting plate 11. In the preferred embodiment, such comibned devices are of a well known type and each includes a tubular receptacle 25 clamped to the supporting plate 11 and extending through a suitable opening in the latter to open at the front surface thereof. The receptacle 25 is provided with suitable internal contacts (not shown) and is internally threaded to receive the tubular body 26 of the securing cap which is also formed with an enlarged flange 27 for engagement over the corner portions of the shields 20 and a slot 28 to receive a tool for screwing the cap into and out of the receptacle 25. The body 26 is formed to receive a light bulb 29 and to urge the latter into engagement with the contacts of the receptacle, and is provided with cutouts 30 permitting the light emitted by the bulb 29 to enter the edge portions of the adjacent cores 15. A cylindrical color filter 31 is preferably provided around the tubular body 26 to suitably color the light entering the cores 15, and an insulating washer 32 is interposed between the flange 27 of the securing cap and the shields 20. Thus, the securing caps not only constitute parts of the light emitting assembly but also hold the shields 20 and sections 13 in place.

In the embodiment of the invention illustrated in Figs. 1–10, the action of the annular dark coated area surrounding the opening 14 at the rear surface of section 13 in preventing reflection of light toward the viewer is demonstrated by the lines $a$, $b$, and $c$ (Fig. 10) representing typical rays of light emitted by the bulb 29. It is apparent that ray $a$ striking the rear surface of core 15 in the outer area covered by the light colored layer 17 is reflected forwardly against the front surface of the core and then reflected rearwardly and out through the bevelled edge of the opening 14 to illuminate the instrument behind the opening 12 of the supporting plate. Rays, such as the ray $b$, emitted from the bulb in a direction substantially parallel to the front and rear surfaces of the core 15, pass directly out of the core at the bevelled edge of the opening 14 and, by reason of such bevel, are refracted rearwardly an appreciable degree for impingement against the instrument face. Finally, rays, such as the ray $c$, which strike the rear surface of the core 15 within an area close to the opening 14 so that they would otherwise be reflected forwardly out through the bevelled edge of the opening to interfere with the viewer's vision, are instead absorbed by the dark, light absorbing coating 19 which is immediately adjacent to the rear surface of the core 15 in the annular area 33 (Fig. 9) surrounding the opening 14.

Figure 11:
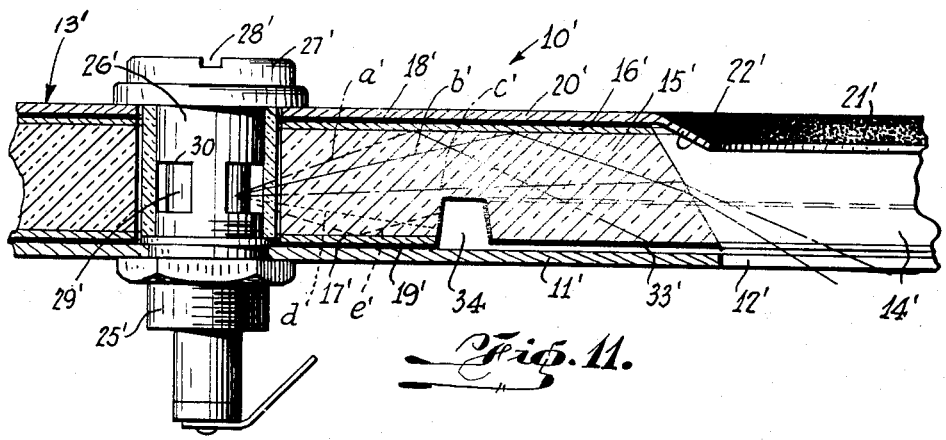
Fig. 11 is a fragmentary sectional view, similar to Fig. 10, but showing a panel constructed according to another embodiment of the invention.

In the embodiment of the invention illustrated in Fig. 11 the parts thereof are similar to those already described in connection with the first mentioned embodiment and are indicated by primed reference numerals corresponding to those numerals identifying the corresponding parts of the latter. The embodiment of Fig. 11 is distinguished by a circular groove 34 formed in the section 13' concentric with the opening 14' and opening at the rear surface of the illuminating panel section. The surfaces of the groove 34, as well as the portion 33' of the rear surface of the core 15 enclosed by said groove, are coated with a light absorbing dark layer, for example of paint or lacquer, immediately adjacent to the core 15'.

The groove 34 acts as a light hurdle in the manner illustrated by the representative light rays $a'$, $b'$, $c'$, $d'$ and $e'$ to cooperate with the coated area 33' in barring the reflection of any light forwardly into the eyes of the viewer. Thus, the ray $a'$ emitted by the filament of the bulb 29' is reflected rearwardly from the front surface of core 15' and strikes the rear surface of the latter in the coated area 33' to be absorbed; the ray $b'$ is reflected rearwardly from the forward face of the core and passes out through the bevelled edge of the opening 14' to illuminate the instrument; ray $c'$ extends across the center of the core 15' and passes out through the bevelled edge at the opening without being reflected by either the front or rear faces of the core; ray $d'$ strikes against the outer side surface of the groove 34 and is absorbed by the dark coating thereon; and ray $e'$ is reflected off the portion of the rear surface of the core having a light colored coating 17' immediately adjacent thereto and against the outside surface of the groove 34 to be absorbed thereat.

Figs. 12–15, are representative of other forms of illuminating sections of panels, for example those which are used in aircraft systems and instruments, such as temperature measuring systems, electrical thermometer indicators, oil and fuel pressure gages, etc. In Figs. 12–15, 20$a$ is a shield, corresponding to shield 20 in Figs. 2, 3 and 4, and 24$a$, 24$b$ and 24$c$, are cut outs corresponding to cut out 24 in Figs. 5 and 9. 50, 50$a$ and 50$b$ are panel sections having respective openings 51, 51$a$ and 51$b$ provided with respective polished bevelled edges 52, 52$a$ and 52$b$. 53, 53$a$ and 53$b$ are respective pointers or needles, the pointer or needle 53 (Fig. 12) being provided with a ball portion 54. In Fig. 13, a scale is indicated by the numeral 55 and in Fig. 14 by the numeral 55$a$. The numerals 56 and 60 indicate opaque dark colored outer layers, numerals 57 and 59 indicate layers of light colored, preferably white, material, and numeral 58 the core of clear, transparent, light transmitting material.

From the above detailed description of preferred embodiment of my invention, it is apparent that panels are provided which are built-up, at least in part, from illuminating panel sections of standardized dimensions so that panels may be constructed therefrom to accommodate various arrangements of instruments; that the several panel sections are secured in place by devices that also serve to illuminate the cores thereof; that the several panel sections are replaceable independently of the other sections forming the panel; and that the panel sections are constructed so as to illuminate the instruments supported there-behind without reflection or glare being directed into the eyes of the viewer.

Having described and illustrated preferred embodiments of the present invention, it is to be understood that I do not desire to be limited to such precise embodiments and that the invention should be accorded a scope commensurate with its contributions to the art which are intended to be defined in the appended claims.

What I claim is:

1. A panel comprising a supporting plate having spaced openings for exposing the faces of instruments mounted behind said plate, an illuminating panel section positioned at the front of said plate for each of said openings in the latter, each of said sections being formed with a central opening registering with the related opening in said plate and including a sheet of light transmitting material, said sections meeting along their edges and being formed with mating cutouts in the marginal edge portions thereof, and light emitting means including a tubular body carried by said plate and extending into each of said mating cutouts, said tubular body having apertures and accommodating a light source to admit light to the adjacent light transmitting sheets, and an enlarged head on the end of each tubular body remote from said plate to hold the adjacent light transmitting sheets in position in front of said plate.

2. A panel according to claim 1, including an opaque shield in front of each of said illuminating panel sections and held against the latter by said heads of the tubular bodies, said shield being formed with openings having rearwardly inclined flanged edges to extend over the edges of the openings in related sections and shield the latter from view from in front of the panel.

3. A panel comprising a supporting plate having spaced openings formed therethrough to expose the faces of instruments mounted therebehind, a substantially rectangular light transmitting panel section at the front of said plate for each of said openings in the latter, said sections abutting each other at their adjacent edges and being formed with central openings to register with the related openings in said plate, said sections being formed with arcuate cutouts in the corners thereof so that a cylindrical space is formed where the corners of four sections meet, and light emitting means including a tubular body carried by said plate and extending into each of said cylindrical spaces to admit light to the adjacent sections through the marginal edges of the latter and a securing cap on each tubular body overlying the front surfaces of the sections to hold the latter against said supporting plate.

4. An instrument illuminating panel comprising a sheet of light transmitting material formed with an opening to expose the face of an instrument therebehind, means admitting light to said sheet for emission at the edge of said opening, said edge of the opening being bevelled forwardly so that the light emitted therefrom is refracted rearwardly to illuminate an instrument behind the panel and the entire face of the instrument may be viewed along lines forming substantial angles with the normal to said sheet, and an opaque shield in front of said sheet having an opening registering with said opening in the sheet and formed with a rearwardly inclined flange at the edge of the shield opening which is spaced angularly from the bevelled light emitting edge and extends toward the center of the sheet opening in the direction parallel to the plane of said sheet as far as the rear margin of said bevelled light emitting edge thereby to hide said light emitting edge from view from locations in front of the panel.

5. An instrument illuminating panel according to claim 4; including a layer of white reflecting material on the front surface of said sheet, a layer of dark, light absorbing material on the portion of the rear surface of said sheet surrounding said opening in the latter and extending to said sheet opening, and a layer of white reflecting material on the remainder of said rear surface, said shield and said layer of light absorbing material preventing forward reflection through said sheet opening of the light admitted to said sheet.

6. An instrument illuminating panel according to claim 5; wherein said sheet is formed with a continuous groove in the rear surface thereof and extending parallel to the edge of said sheet opening along the outer margin of said portion surrounding the opening, and a layer of light absorbing material on the surfaces of said groove so that the latter operates as a light trap and said portion of the rear surface having light absorbing material thereon may be reduced extent.

References Cited in the file of this patent

UNITED STATES PATENTS

| Number | Name | Date |
|---|---|---|
| 1,739,954 | DuPont | Dec. 17, 1929 |
| 1,871,552 | Padesky | Aug. 16, 1932 |
| 1,972,541 | Teichmann | Sept. 4, 1934 |
| 2,128,246 | Hardesty | Aug. 30, 1938 |
| 2,131,471 | Carter | Sept. 27, 1938 |
| 2,259,910 | Rylsky | Oct. 21, 1941 |
| 2,507,035 | Maynard | May 9, 1950 |
| 2,537,971 | Dames | Jan. 16, 1951 |
| 2,562,498 | Leboffe | July 31, 1951 |
| 2,594,081 | Shlenker | Apr. 22, 1952 |
| 2,595,973 | Neugass | May 6, 1952 |
| 2,602,036 | Sullivan | July 1, 1952 |

FOREIGN PATENTS

| Number | Country | Date |
|---|---|---|
| 895,017 | France | Mar. 17, 1944 |